US012715446B2

(12) United States Patent
Hilnbrand et al.

(10) Patent No.: US 12,715,446 B2
(45) Date of Patent: Aug. 25, 2026

(54) CALIBRATING A GESTURE-BASED SYSTEM FOR A VEHICLE

(71) Applicant: Toyota Jidosha Kabushiki Kaisha, Toyota (JP)

(72) Inventors: Brian R Hilnbrand, San Jose, CA (US); Jimmy Chiu, San Jose, CA (US); Owen Davis, Berkeley, CA (US); Alexander Charles Granieri, Mountain View, CA (US); Conor Powers Sullivan, Campbell, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 290 days.

(21) Appl. No.: 18/421,190

(22) Filed: Jan. 24, 2024

(65) Prior Publication Data

US 2025/0236301 A1 Jul. 24, 2025

Related U.S. Application Data

(60) Provisional application No. 63/590,822, filed on Oct. 17, 2023.

(51) Int. Cl.

*G06F 3/01* (2006.01)
*B60W 40/08* (2012.01)

(Continued)

(52) U.S. Cl.

CPC ............ *B60W 40/08* (2013.01); *B60W 50/10* (2013.01); *G06F 3/017* (2013.01); *G06V 20/59* (2022.01); *B60W 2540/223* (2020.02)

(58) Field of Classification Search

CPC ................. B60W 40/08; B60W 50/10; B60W 2540/223; G06F 3/017; G06F 3/013; G06F 9/453; G06V 20/59; G06V 40/28; G06V 10/147; G06V 40/193; G06V 40/197; A61B 3/0041; A61B 3/113; A61B 5/18;

(Continued)

(56) References Cited

U.S. PATENT DOCUMENTS 6,531,999 B1 3/2003 Trajkovic
8,760,432 B2 6/2014 Jira et al.

(Continued)

FOREIGN PATENT DOCUMENTS

DE 102015210090 A1 12/2016

OTHER PUBLICATIONS

U.S. Appl. No. 63/590,822, filed Oct. 17, 2023 to Hilnbrand.

*Primary Examiner* — Rinna Yi

(74) *Attorney, Agent, or Firm* — Christopher G. Darrow; Darrow Mustafa PC

(57) ABSTRACT

System, methods, and other embodiments described herein relate to gesture-based systems for vehicles. In one embodiment, a method includes, in response to initiating a calibration process, identifying calibration targets. The method also includes detecting positional information of gestures performed by an occupant of a vehicle in relation to the calibration targets. The method also includes deriving, based on the positional information of the gestures and locations of the calibration targets, a biometric signature of the occupant. The biometric signature includes a manner in which the occupant points that is unique to the occupant. The method further includes providing the biometric signature.

17 Claims, 8 Drawing Sheets

(51) Int. Cl.
*B60W 50/10* (2012.01)
*G06V 20/59* (2022.01)

(58) Field of Classification Search
CPC ... A61B 5/1176; A61B 2503/22; A61B 5/163; B60K 35/10; B60K 35/22; B60K 35/285; B60K 35/81; B60K 2360/149; B60K 2360/146; G06T 7/70; G06T 2207/30201
See application file for complete search history.

(56) References Cited

U.S. PATENT DOCUMENTS

| | | | | |
|---|---|---|---|---|
| 8,886,399 | B2 | 11/2014 | El Dokor et al. | |
| 9,430,046 | B2 | 8/2016 | Steers | |
| 10,459,080 | B1 | 10/2019 | Schwesig et al. | |
| 10,745,018 | B2 | 8/2020 | Abendroth et al. | |
| 11,167,771 | B2 | 11/2021 | Caron et al. | |
| 2006/0294393 | A1 | 12/2006 | McCall | |
| 2014/0309866 | A1* | 10/2014 | Ricci | G06F 21/32 701/36 |
| 2016/0342205 | A1* | 11/2016 | Shigeta | G06V 10/147 |
| 2018/0046255 | A1 | 2/2018 | Rothera et al. | |
| 2021/0232642 | A1* | 7/2021 | Ricci | G06F 16/25 |
| 2022/0382379 | A1 | 12/2022 | Katz et al. | |
| 2024/0362931 | A1* | 10/2024 | Katz | G06V 40/20 |

* cited by examiner 100
354
350
352
370

100
360
300
362
364
370

CALIBRATING A GESTURE-BASED SYSTEM FOR A VEHICLE

CROSS-REFERENCE TO RELATED APPLICATIONS

This application claims the benefit of U.S. Provisional Application No. 63/590,822, filed on Oct. 17, 2023, which is herein incorporated by reference in its entirety.

TECHNICAL FIELD

The subject matter described herein relates, in general, to gesture-based systems for use by occupants of vehicles and, more particularly, to calibrating gesture-based systems for improved detection of objects and/or areas toward which occupants gesture.

BACKGROUND

Vehicles may be equipped with gesture-based systems that allow occupants to obtain information from the vehicle or execute vehicle functions using gestures, and in some cases, gestures combined with verbal inputs. In some instances, occupants may perform gestures using various body parts, for example, with their hand, arm, head, and/or eyes. Moreover, occupants may perform gestures from various locations within the vehicle, for example, from the driver's seat, from the passenger's seat, or even from a rear seat. In some cases, these variations in the gestures may render it difficult to identify a specific object and/or area toward which the occupant gestures.

Accordingly, it is beneficial to provide a gesture-based system that can identify various aspects of the gesture, such as the type of gesture, the direction of the gesture, and the location from which the gesture is made. However, difficulties in identifying such aspects arise when different occupants gesture in different ways. More specifically, occupants may have their own biometric signatures, which define various particularities in the way that an occupant moves, for example, the way they lift their hand, point their fingers, tilt their head, and shift their eyes. Because of these particularities, gesture-based systems may lack sufficient accuracy in determining types and/or directions of gestures. Moreover, gesture-based systems may not operate as intended when used by different occupants due to the unique biometric signatures of each occupant.

SUMMARY

Example systems and methods relate to a manner of improving gesture-based systems for vehicles. Various aspects of occupants can make it difficult to detect gestures when using gesture-based systems. For example, the type of gesture, the direction of the gesture, the seat from which the occupant gestures, and particularities in the way in which an occupant moves can all make it difficult to accurately detect occupant gestures.

Accordingly, in one approach, a gesture-based system for a vehicle initiates a calibration process to determine a biometric signature of an occupant of the vehicle that calibrates the system to the specific user. During the calibration process, in one approach, the gesture-based system identifies calibration targets at which an occupant of the vehicle gestures, and the gesture-based system instructs the occupant to gesture at the calibration targets. As the occupant gestures at the calibration targets, the gesture-based system, in one embodiment, detects various aspects of the gestures. For example, the gesture-based system detects the body part used to gesture, the type of gesture, and positional information of the gesture. Using this information, in one approach, the gesture-based system correlates the gesture information with the locations of the calibration targets, which are known to the gesture-based system. More specifically, for example, the gesture-based system detects positional information of the gestures (e.g., angles of the gestures that are offset from the locations of the calibration targets) and generates a gesture matrix including the angles of the gestures. In one approach, the biometric signature includes the gesture matrix, which can subsequently be used to translate the occupant gestures to accurate locations in the environment. In one approach, to detect an object or area toward which the occupant gestures, the gesture-based system translates the gesture matrix to identify a location of the object or area.

In one embodiment, the gesture-based system instructs the occupant to gesture at multiple targets sequentially to derive sufficient positional information to derive the biometric signature. Once the gesture-based system derives the biometric signature using the positional information, the biometric signature can subsequently be used to identify objects and areas toward which an occupant gestures. In some instances, when gesturing, the occupant can also provide a verbal input. For example, the occupant may point to a restaurant and ask the gesture-based system, "What does that restaurant serve?" In this instance, the gesture-based system uses the biometric signature to identify that the occupant is gesturing toward the restaurant and returns the requested information to the occupant. In another example, the occupant may point to a vent in the passenger compartment of the vehicle and tell the gesture-based system, "Turn on the air conditioning." In this instance, the gesture-based system uses the biometric signature to identify that the occupant is gesturing toward the vent and executes the action of turning on the air conditioning.

Accordingly, the systems and methods described herein provide the benefit of calibrating a gesture-based system for various occupants of the vehicle based on their biometric signatures. As such, the calibration process improves the identification of objects, locations, areas, etc. toward which an occupant gestures, thereby facilitating more accurate information provided by the gesture-based system and/or more precise actions executed by the gesture-based system.

In one embodiment, a gesture-based system for a vehicle is disclosed. The gesture-based system includes a processor and a memory communicably coupled to the processor. The memory stores a module including instructions that when executed by the processor cause the processor to, in response to initiating a calibration process, identify calibration targets. The instructions also cause the processor to detect positional information of gestures performed by an occupant of a vehicle in relation to the calibration targets. The instructions also cause the processor to derive, based on the positional information of the gestures and locations of the calibration targets, a biometric signature of the occupant. The biometric signature includes a manner in which the occupant points that is unique to the occupant. The instructions further cause the processor to provide the biometric signature.

In one embodiment, a non-transitory computer-readable medium for a gesture-based system and including instructions that when executed by a processor cause the processor to perform one or more functions is disclosed. The instructions cause the processor to, in response to initiating a calibration process, identify calibration targets. The instructions also cause the processor to detect positional information of gestures performed by an occupant of a vehicle in relation to the calibration targets. The instructions also cause the processor to derive, based on the positional information of the gestures and locations of the calibration targets, a biometric signature of the occupant. The biometric signature includes a manner in which the occupant points that is unique to the occupant. The instructions further cause the processor to provide the biometric signature.

In one embodiment, a method for calibrating a gesture-based system is disclosed. In one embodiment, the method includes, in response to initiating a calibration process, identifying calibration targets. The method also includes detecting positional information of gestures performed by an occupant of a vehicle in relation to the calibration targets. The method also includes deriving, based on the positional information of the gestures and locations of the calibration targets, a biometric signature of the occupant. The biometric signature includes a manner in which the occupant points that is unique to the occupant. The method further includes providing the biometric signature.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
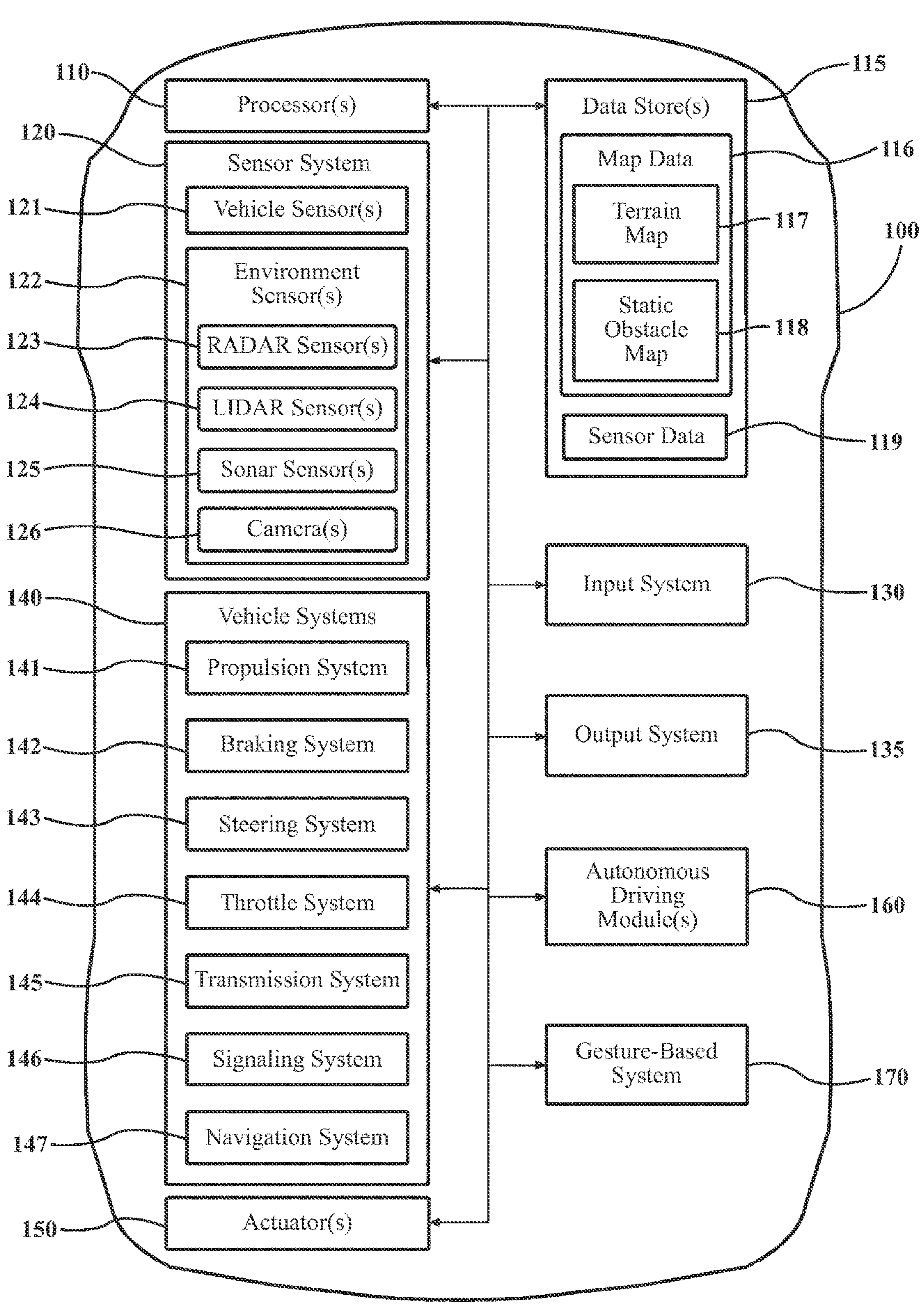
FIG. 1 illustrates one embodiment of a vehicle within which systems and methods disclosed herein may be implemented.

Systems, methods, and other embodiments associated with improving gesture-based systems are disclosed herein. Occupants of vehicles equipped with gesture-based systems may have their own biometric signatures, which define various particularities in the way that an occupant moves, for example, the way they lift their hand, point their fingers, tilt their head, and shift their eyes. Because of these particularities, gesture-based systems may lack sufficient accuracy in determining types and/or directions of gestures. Moreover, gesture-based systems may not operate as intended when used by different occupants due to the unique biometric signatures of each occupant. Accordingly, in one embodiment, a gesture-based system is configured to implement a calibration process to derive a biometric signature for an occupant of a vehicle. In one example, a biometric signature is a characterization of a unique manner in which the occupant moves, for example, particularities in the way in which the occupant points their finger, moves their head, or shifts their eyes. Deriving a biometric signature for an occupant facilitates better detection of gestures by the gesture-based system and, as a result, better identification of objects and/or areas in the external environment of the vehicle toward which the occupant gestures.

To execute the calibration process, in one approach, the gesture-based system identifies calibration targets and instructs the occupant to gesture toward the calibration targets. The calibration targets may take various forms. For example, the calibration targets can include selectively activatable areas of a light bar in the vehicle's passenger compartment, illuminated portions and/or icons on a heads-up display or user interface of the vehicle, objects and/or targets projected into the external environment of the vehicle, features of the vehicle itself, for example, mirrors, seats, or pillars, etc. Thus, the gesture-based system may select among available options for the calibration targets according to various factors, including the body part the occupant uses for gesturing and the seat in the vehicle from which the occupant gestures. For example, the gesture-based system processes sensor data regarding the internal and external environments of the vehicle to identify salient calibration targets. The gesture-based system may select calibration targets based on the location of potential calibration targets, the location of the occupant, the prominence and/or visibility of calibration targets to the occupant, etc. In one approach, the gesture-based system instructs the occupant to gesture sequentially at the calibration targets. The instructions are provided audibly, visually, or through written instructions, and the occupant can gesture using various body parts, for example, with their finger, hand, arm, head, eyes, etc. In one embodiment, a gesture is motion of a body part in order to indicate a direction in the surrounding environment of a gesturing person via, for example, a finger, a hand, an arm, a head, or eyes. The direction may be defined along a one-dimensional reference as an angle relative to either side of the occupant or the vehicle or as a two-dimensional reference that uses the angle and an elevation.

As the occupant gestures toward the calibration targets, the gesture-based system, in one embodiment, detects the gestures and positional information of the gestures. The positional information, in one approach, includes offset angles of each gesture in relation to the locations of the calibration targets. Detecting the positional information, in one approach, is advantageous, as the occupant's gestures may deviate from the location of the calibration targets. For example, an occupant pointing at a calibration target located directly ahead of the occupant may believe that they are pointing straight at the calibration target, but might actually be holding their hand a few degrees off of the calibration target. Accordingly, in one approach, the gesture-based system detects offset angles of each gesture compared to the locations of the calibration targets.

Upon the detection of the positional information of the gestures, the gesture-based system, in one embodiment, derives a biometric signature of the occupant, for example, based on the positional information of the gestures. More specifically, in one example, the gesture-based system derives a matrix of the offset angles of each gesture, and the matrix is the biometric signature. In one approach, the matrix includes offset angles of each gesture in different regions of the environment of the vehicle. For example, the matrix can include offset angles of gestures performed toward the right side of the environment (e.g., the passenger's side of the vehicle), the center of the environment, the left side of the environment (e.g., the driver's side of the vehicle), etc. Including offset angles in various regions of the environment may be advantageous, as an occupant may gesture differently toward each region.

Subsequent to deriving the biometric signature, in one approach, the gesture-based system uses the biometric signature for various tasks. In one example, the biometric signature is provided in order to identify objects and/or areas in the external environment toward which an occupant gestures when using the gesture-based system outside of the calibration process. More specifically, in one approach, the gesture-based system detects a gesture and identifies a gesture target (e.g., an object and/or area in the external environment) based on the gesture and the biometric signature. For example, in one embodiment, the gesture-based system identifies a location of the gesture and translates the location of the gesture according to the biometric signature to identify the gesture target. Subsequently, in one approach, the gesture-based system can execute an action based on the gesture target, for example, returning information about the gesture target to the occupant.

Accordingly, through execution of the calibration process, the systems and methods described herein provide the benefit of calibrating a gesture-based system for a vehicle for various occupants of the vehicle based on the biometric signatures of the occupants. As such, the calibration process improves the identification of objects, locations, areas, etc. toward which an occupant gestures, thereby facilitating more accurate information provided by the gesture-based system and/or more precise actions executed by the gesture-based system.

Referring now to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with improvements to gesture-based systems.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 1-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a gesture-based system 170 that is implemented to perform methods and other functions as disclosed herein relating to improving the detection of occupant gestures and subsequent derivation of the occupant's biometric signature. In some embodiments, the gesture-based system 170 is implemented partially within the vehicle 100 and as a cloud-based service. For example, in one approach, functionality associated with at least one module of the gesture-based system 170 is implemented within the vehicle 100 while further functionality is implemented within a cloud-based computing system.

Figure 2:
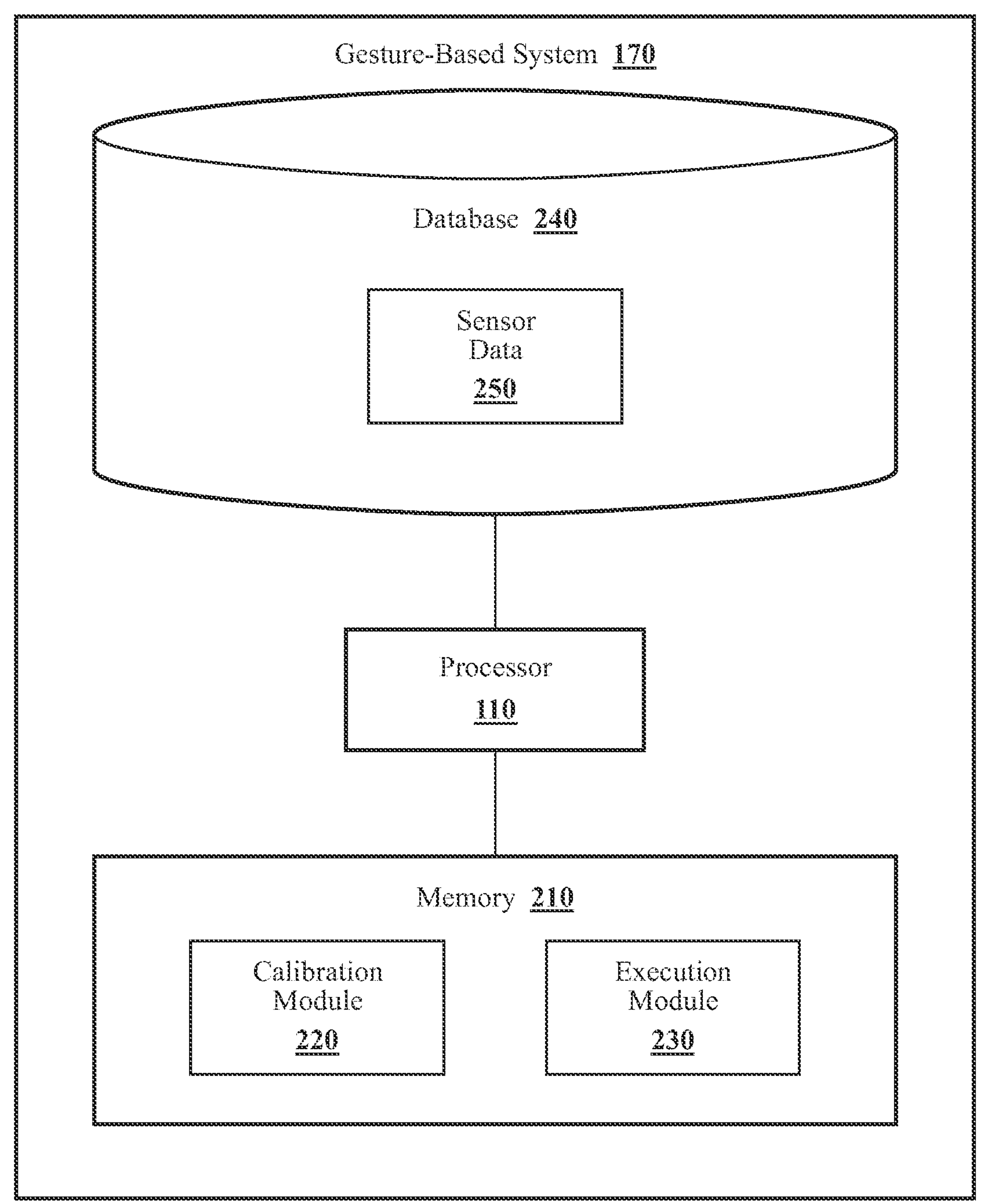
FIG. 2 illustrates one embodiment of a gesture-based system that is associated with the vehicle of FIG. 1.

With reference to FIG. 2, one embodiment of the gesture-based system 170 of FIG. 1 is further illustrated. The gesture-based system 170 is shown as including a processor 110 from the vehicle 100 of FIG. 1. Accordingly, the processor 110 may be a part of the gesture-based system 170, the gesture-based system 170 may include a separate processor from the processor 110 of the vehicle 100, or the gesture-based system 170 may access the processor 110 through a data bus or another communication path. In one embodiment, the gesture-based system 170 includes a memory 210 that stores a calibration module 220 and an execution module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that, when executed by the processor 110, cause the processor 110 to perform the various functions disclosed herein.

With reference to FIG. 2, the calibration module 220 generally includes instructions that function to control the processor 110 to receive data inputs from one or more sensors of the vehicle 100. The inputs are, in one embodiment, observations of one or more objects in and/or areas of an external environment of the vehicle 100 and/or other aspects about the surroundings, as well as observations of one or more objects in an internal environment of the vehicle 100, for example, one or more occupants of the vehicle 100. As provided for herein, the calibration module 220, in one embodiment, acquires sensor data 250 that includes at least camera images. In further arrangements, the calibration module 220 acquires the sensor data 250 from further sensors such as a radar 123, a LiDAR 124, and other sensors as may be suitable for identifying objects in and/or areas of the external and or internal environments of the vehicle 100.

Accordingly, the calibration module 220, in one embodiment, controls the respective sensors to provide the data inputs in the form of the sensor data 250. Additionally, while the calibration module 220 is discussed as controlling the various sensors to provide the sensor data 250, in one or more embodiments, the calibration module 220 can employ other techniques to acquire the sensor data 250 that are either active or passive. For example, the calibration module 220 may passively sniff the sensor data 250 from a stream of electronic information provided by the various sensors to further components within the vehicle 100. Moreover, the calibration module 220 can undertake various approaches to fuse data from multiple sensors when providing the sensor data 250 and/or from sensor data acquired over a wireless communication link (e.g., v2v). Thus, the sensor data 250, in one embodiment, represents a combination of perceptions acquired from multiple sensors.

In one approach, the calibration module 220 implements and/or otherwise uses a machine learning algorithm. In one configuration, the machine learning algorithm is embedded within the calibration module 220, such as a convolutional neural network (CNN), to perform various perceptions approaches over the sensor data 250 from which further information is derived. Of course, in further aspects, the calibration module 220 may employ different machine learning algorithms or implements different approaches for performing the machine perception, which can include deep neural networks (DNNs), recurrent neural networks (RNNs), or another form of machine learning. Whichever particular approach the calibration module 220 implements, the calibration module 220 provides various outputs from the information represented in the sensor data 250. In this way, the system is processes the sensor data 250 into contextual representations.

In one or more configurations, the gesture-based system 170 implements one or more machine learning algorithms. As described herein, a machine learning algorithm includes but is not limited to deep neural networks (DNN), including transformer networks, convolutional neural networks, recurrent neural networks (RNN), Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the gesture-based system 170 or another system generally trains the machine learning algorithm according to a particular training approach, which may include supervised training, self-supervised training, reinforcement learning, and so on. In contrast to training/learning of the machine learning algorithm, the gesture-based system 170 implements the machine learning algorithm to perform inference. Thus, the general use of the machine learning algorithm is described as inference.

Moreover, in one embodiment, the gesture-based system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, etc.

The calibration module 220, in one embodiment, is further configured to perform additional tasks beyond controlling the respective sensors to acquire and provide the sensor data 250. For example, the calibration module 220, through use of the sensor data 250, calibrates the gesture-based system 170 according to one or more occupants who use the gesture-based system 170. In other words, the calibration module 220 includes instructions that cause the processor 110 to execute a calibration process. In one embodiment, through execution of the calibration process, the calibration module 220 is configured to derive a biometric signature of an occupant. A biometric signature characterizes, for example, a manner in which the occupant moves that is unique to the occupant. The biometric signature, in one approach, quantifies information about the particularities in which the user moves various body parts, for example, their fingers, hands, wrists, arms, shoulders, eyes, head, and relations therebetween. Accordingly, through execution of the calibration process, the calibration module 220, in one embodiment, derives a biometric signature of an occupant, and the gesture-based system 170 operates according to the biometric signature.

In one approach, the calibration module 220 begins the calibration process. Accordingly, in one embodiment, the calibration module 220 includes instructions that cause the processor 110 to initiate the calibration process. In some instances, it is advantageous to initiate the calibration process when a regular occupant of the vehicle 100 uses the vehicle 100 and/or when a new occupant is identified to be using the vehicle 100. Moreover, the calibration module 220 can initiate the calibration process periodically to maintain accuracy of the calibration.

Accordingly, the calibration process can be initiated in various ways. In one example, the calibration module 220 initiates the calibration process when an occupant enters the vehicle 100 and/or when the occupant turns on the vehicle 100. The occupant can be a regular occupant of the vehicle 100 or a newly identified occupant of the vehicle 100. In another example, the calibration module 220 initiates the calibration process when the calibration module 220 determines that calibration is needed, for example, when the occupant's derived biometric signature is not sufficiently accurate, as described in more detail below. In some instances, an occupant can initiate the calibration process on their own accord. An occupant may wish to initiate the calibration process if the occupant decides that the gesture-based system 170 is not calibrated enough to the occupant's gestures. An occupant can initiate the calibration process through various manners, for example, through an input system 130 of the vehicle 100.

In either case, the calibration module 220 may initiate the process automatically according to a defined condition or according to a manual request by an occupant to, for example, maintain accuracy of the calibration throughout a trip in the vehicle 100. In one example, the calibration module 220 initiates the calibration process when the vehicle 100 is stopped at a red light, when the vehicle 100 is in park, or when the vehicle 100 is in neutral, for example, when traveling through a car wash. When the vehicle 100 is in motion again or is no longer in a park or neutral setting, the calibration module 220 can cease the calibration process.

In some instances, initiation of the calibration process also involves the identification of various information that may be subsequently used during the calibration process. For example, it may be advantageous to identify a body part with which the occupant performs gestures (in connection with the calibration process and/or the gesture-based system 170) and/or the location of the vehicle 100 from which the occupant performs gestures (e.g., a seat of the vehicle 100 in which the occupant is sitting). As mentioned above, in one embodiment, a gesture is motion of a body part in order to indicate a direction in the surrounding environment of a gesturing person via, for example, a finger, a hand, an arm, a head, or eyes. The direction may be defined along a one-dimensional reference as an angle relative to either side of the occupant or the vehicle or as a two-dimensional reference that uses the angle and an elevation. In some instances, the body part with which the occupant performs gestures and/or the seat from which the occupant performs gestures may affect various aspects of the calibration process, for example, identification of calibration targets and/or detection of gestures. Accordingly, in one embodiment, the calibration module 220 includes instructions that cause the processor 110 to identify a body part with which the occupant performs gestures and/or a seat from which the occupant performs gestures.

Regarding the body part with which the occupant performs gestures, in one example, in instances in which the occupant gestures with their hand, the calibration module 220 can identify calibration targets that are close together to avoid requiring the occupant to extend their arm far away from their body. Contrariwise, in instances in which the occupant gestures with their eyes or head, the calibration module 220 can identify calibration targets that are far apart from each other. This may facilitate higher-quality calibration, as eye- and head-based gestures may involve small movements that are harder to precisely detect than arm- or hand-based gestures. Moreover, the calibration module 220 may employ different algorithms for detecting gestures performed by the occupant with their hand compared to, for example, gestures performed with their eyes or head.

Identification of the body part with which the occupant gestures can be accomplished in various ways. In one example, the occupant can configure an occupant profile of the vehicle 100 to indicate a body part preference (for example, a preference to use their right hand to perform gestures), and the calibration module 220 can retrieve the preference from the occupant profile. The occupant profile can be part of one or more accessibility settings of the vehicle 100, for example, if the occupant is disabled and does not have a hand with which to gesture. In such instances, the occupant can indicate a preference to gesture with a portion of their arm, their head, or even their eyes. In some instances, however, an occupant may not have a preference configured prior to initiation of the calibration process. Accordingly, the calibration module 220 may be configured to identify a body part with which the occupant performs gestures at some point during the calibration process, and update locations of the calibration targets accordingly in real-time.

Regarding the seat from which the occupant performs gestures, in one example, in instances in which the occupant is a driver, the calibration module 220 can identify calibration targets ahead of the driver (e.g., generally on the left side of the vehicle 100), and in instances in which the occupant is a passenger in the front seat, the calibration module 220 can identify calibration targets ahead of the passenger (e.g., generally on the right side of the vehicle 100). Moreover, the calibration module 220 may employ different algorithms for detecting gestures performed by an occupant from the driver's seat, compared to gestures performed by an occupant from the front passenger's seat or even a rear seat. Identification of the seat can be accomplished in various ways. In one example, the calibration module 220 identifies the seat through data from one or more seat occupancy sensors and/or from other occupant detection sensors such as camera(s) and/or radar located in the passenger compartment of the vehicle 100.

After initiation of the calibration process, in one approach, the calibration module 220 begins the calibration process. During the calibration process, in one embodiment, the occupant gestures at calibration targets, and the calibration module 220 detects positional information of the occupant's gestures to derive the occupant's biometric signature. Accordingly, in one approach, the calibration module 220 includes instructions that cause the processor 110 to identify one or more calibration targets toward which an occupant of the vehicle is to gesture. As described herein, the calibration module 220 first identifies multiple calibration targets. After detecting the occupant's gestures toward the calibration targets or as the calibration module 220 detects the occupant's gestures, the calibration module 220 may identify one or more calibration targets if further positional information is required, as described in further detail below. However, it should be understood that, in some instances, the calibration module 220 may first identify a single calibration target, and then, after detecting the occupant's gesture toward that calibration target, the calibration module 220 may then identify one or more calibration targets as needed. The process of identifying calibration target(s) and positional information of the occupant's gestures toward those calibration target(s) may be repeated to further refine the calibration and derive a more accurate biometric signature. This will be described in further detail below.

Figures 3A, 3B:
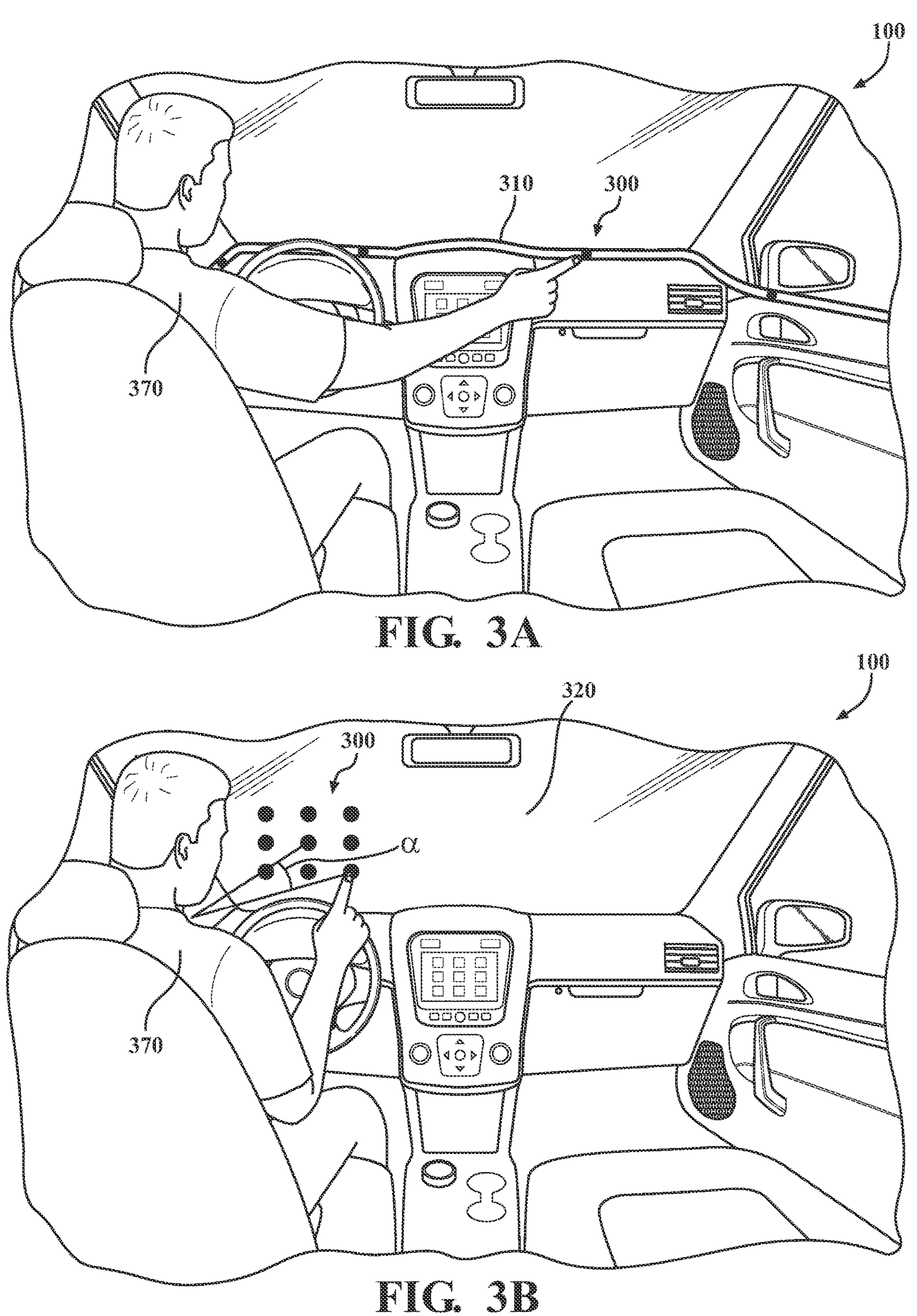
FIG. 3A illustrates a first embodiment of calibration targets used to calibrate the gesture-based system.
FIG. 3B illustrates a second embodiment of calibration targets used to calibrate the gesture-based system.
Figures 3C, 3D:
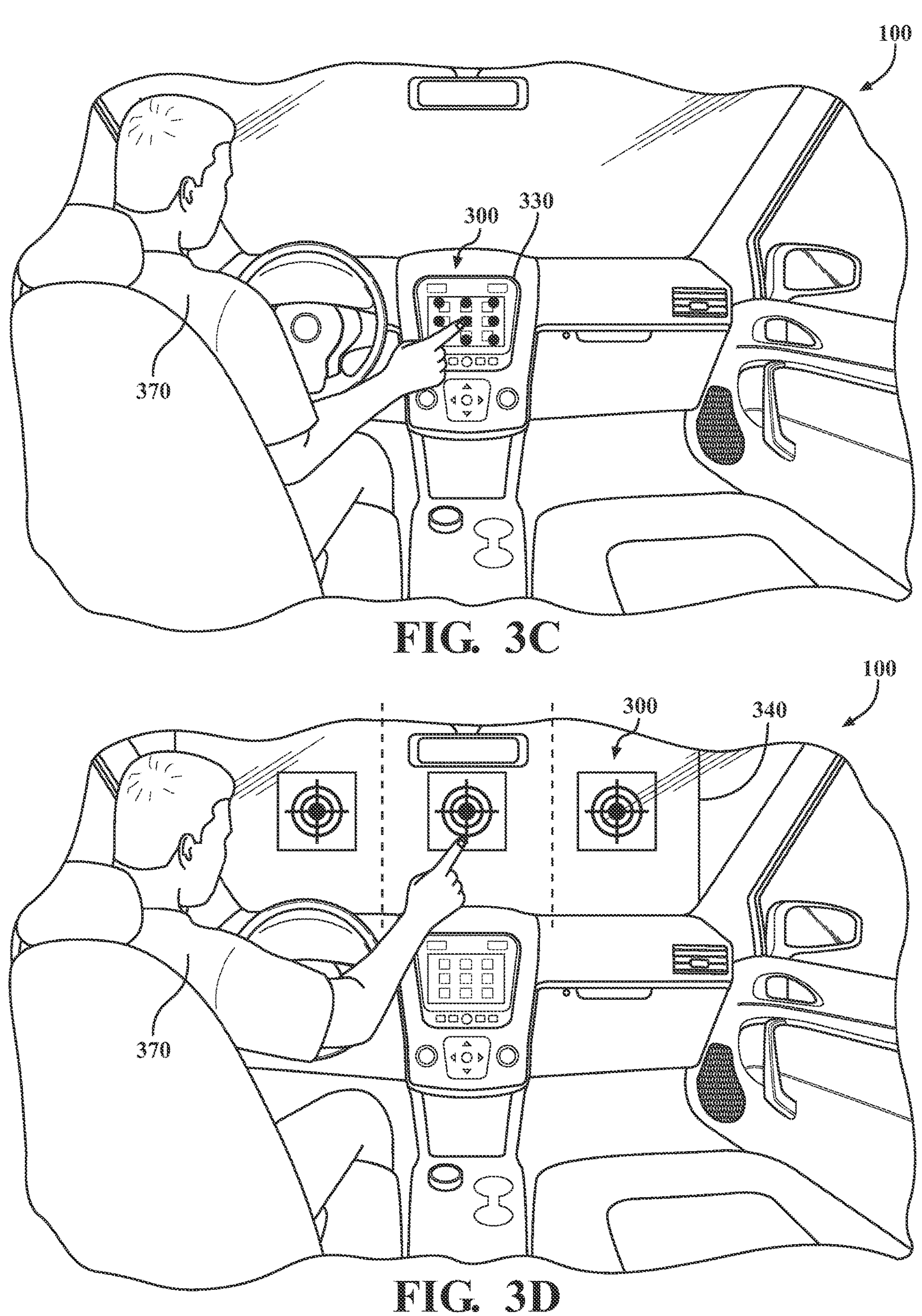
FIG. 3C illustrates a third embodiment of calibration targets used to calibrate the gesture-based system.
FIG. 3D illustrates a fourth embodiment of calibration targets used to calibrate the gesture-based system.
Figures 3E, 3F:
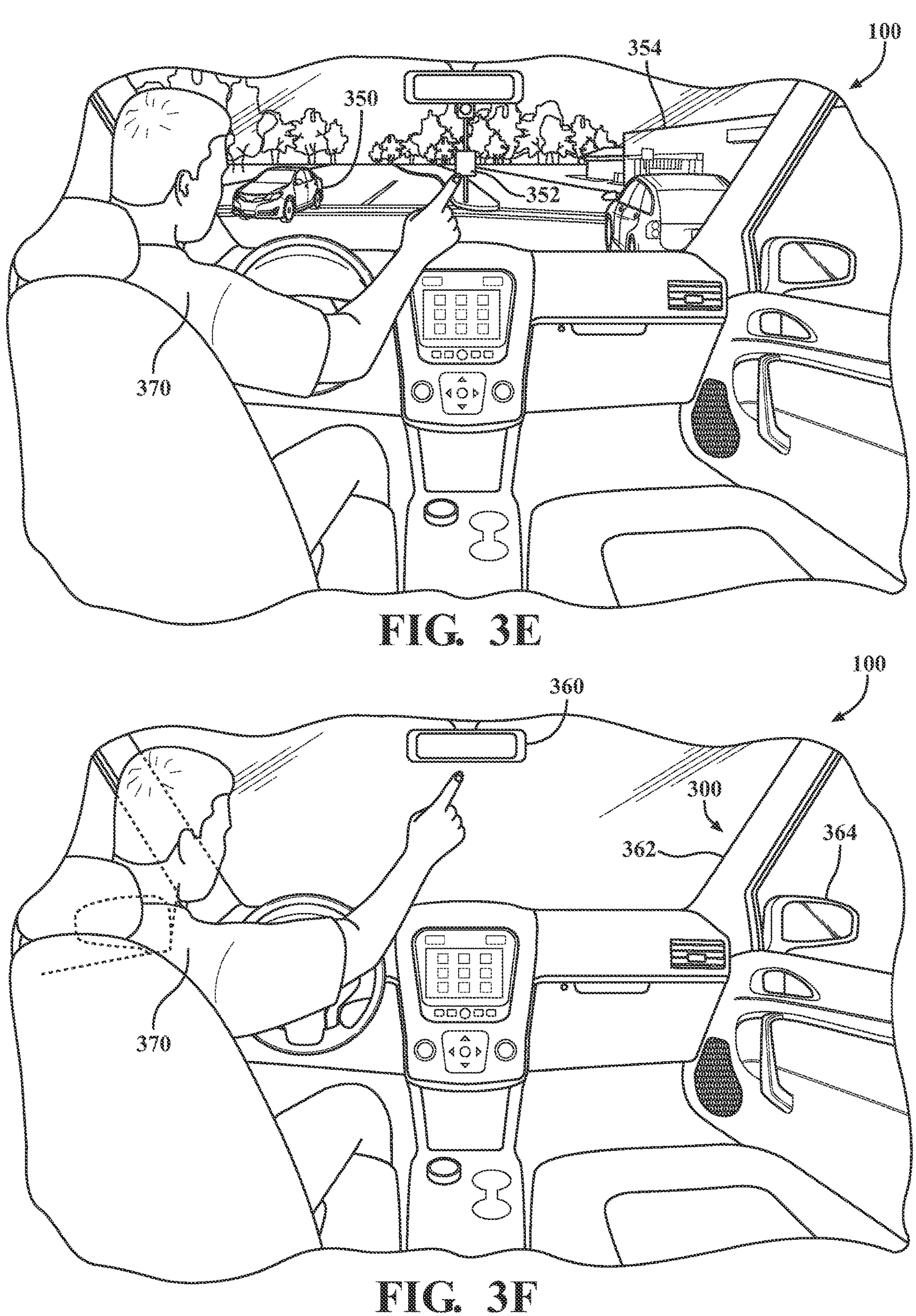
FIG. 3E illustrates a fifth embodiment of calibration targets used to calibrate the gesture-based system.
FIG. 3F illustrates a sixth embodiment of calibration targets used to calibrate the gesture-based system.

Turning now to FIGS. 3A-3F, various examples of calibration targets 300 are illustrated. The calibration targets 300 can be various objects, locations, areas, and/or points-of-interest located in the internal and/or external environments of the vehicle 100. In one approach, for example, as shown in FIGS. 3A-3C, the calibration targets 300 are internal calibration targets 300 located within the vehicle 100, for example, within the passenger compartment of the vehicle 100. In another approach, for example, as shown in FIGS. 3D-3E, the calibration targets 300 are external calibration targets 300 located outside of the vehicle 100, for example, in an external environment of the vehicle 100. In some examples, for instance, as shown in FIG. 3F, the calibration targets 300 are both internal and external calibration targets 300. Examples of both internal and external calibration targets 300 are described in further detail below.

Various examples of internal calibration targets 300 will now be described. Referring now to FIG. 3A, in one approach, the vehicle 100 includes a light bar 310, and the calibration targets 300 are selectively activatable regions of the light bar 310. In one embodiment, the light bar 310 wraps around a portion of the passenger compartment of the vehicle 100, as shown in FIG. 3A. For example, the light bar 310 wraps around a dashboard of the vehicle 100 and one or more doors of the vehicle 100. However, the light bar 310 can be attached to other components of the vehicle 100. For example, the light bar 310 may wrap around a steering wheel of the vehicle 100, around the windshield of the vehicle 100, etc. As mentioned above, in one embodiment, the calibration targets 300 are selectively activatable regions of the light bar 310. For example, in one approach, the light bar 310 includes individually activatable lights (e.g., LED lights), and the calibration module 220 identifies the calibration targets 300 by selectively activating the lights in different areas of the light bar 310.

In another embodiment, referring now to FIG. 3B, the calibration targets 300 are images projected onto or within areas of a windshield 320 of the vehicle 100. In one approach, the images can be icons (e.g., dots, pictures, etc.) projected onto the windshield 320, for example, by an interior projector within the vehicle 100 (e.g., by a heads-up display of the vehicle 100, an augmented reality display integrated with the windshield, etc.). In another approach, the images associated with areas of the windshield 320 can be lighted areas of the windshield 320 lighted by, for example, an interior light within the vehicle 100 or by illuminating portions of a heads-up display of the vehicle 100.

Referring now to FIG. 3C, in one embodiment, the calibration targets 300 are areas of a user interface 330 of the vehicle 100. The user interface 330 can be an input system 130 or an output system 135 of the vehicle 100, both of which are described in further detail below in connection with FIG. 1. In one approach, the areas of the user interface 330 are icons displayed on the user interface 330, while in another approach, the areas of the user interface 330 are illuminated portions of the user interface 330.

As shown in FIGS. 3B and 3C, the calibration targets 300 form an array (e.g., a light array). More specifically, as shown, the array includes 9 calibration targets arranged in a 3×3 array. However, in other embodiments, the calibration targets 300 form an array of another number of calibration targets 300 arranged in another type of array. For example, the calibration targets 300 can include 4 calibration targets 300 arranged in a 2×2 array, 16 calibration targets 300 arranged in a 4×4 array, 25 calibration targets 300 arranged in a 5×5 array, and so on. Moreover, it should be noted that the calibration targets 300 do not have to form a square or rectangular array. Instead, in other embodiments, the calibration targets 300 can form an array having another shape, for example, a circular array, a triangular array, etc. Further, the calibration targets 300 do not have to be arranged in a particular form. Rather, the calibration targets 300 can form a randomized arrangement of calibration targets 300 with no defined shape or array.

As mentioned above, FIGS. 3A-3C depict various examples of internal calibration targets 300. Now, various examples of external calibration targets 300 will be described. Referring to FIG. 3D, in one embodiment, the calibration targets 300 are images projected onto one or more objects in the external environment of the vehicle 100. As shown in FIG. 3D, the object is a wall 340, for example, a wall ahead of the vehicle 100 when the vehicle 100 is parked in a garage. However, the object can be other objects in the external environment, for example, a road surface, street signs, trees, etc. The calibration targets 300 are projected images, for example, icons of targets, as shown in FIG. 3D. In other embodiments, the calibration targets 300 can be other projected images, for example, other types of icons, shapes, letters, words, etc. The calibration targets 300 can be projected into the external environment, in one embodiment, by a projector located on or within the vehicle 100. In another approach, the calibration targets 300 can be projected by one or more headlights of the vehicle 100, for example, by headlight projectors.

Referring now to FIG. 3E, in one embodiment, the calibration targets 300 are objects in and/or areas of the external environment itself. For example, the calibration targets 300 are a nearby vehicle 350, a street sign 352, a building 354, a point of interest (POI), etc. In one approach, the objects and/or areas can be stationary, for example, parked vehicles, buildings, street signs, etc., however, in another approach, the objects and/or areas can be moving, for example, moving vehicles. In this embodiment, the calibration module 220 actively detects objects and/or areas in the external environment that are suitable for use as calibration targets 300. An object and/or area may be suitable for use as a calibration target 300 if it is easily distinguishable by the occupant as an object and/or area toward which the occupant can gesture. In one approach, the calibration module 220 detects the calibration targets 300 through data collected by the autonomous driving module(s) 160. In one embodiment, a calibration target 300 is easily distinguishable by the occupant when it is a calibration target 300 that is identified by the autonomous driving module(s) 160 as an obstacle or other environmental feature including traffic signs, trees, shrubs, neighboring vehicles, pedestrians, etc.

While various examples of internal calibration targets 300 and external calibration targets 300 are shown separately in FIGS. 3A-3F, it should be noted that, as mentioned above, the calibration targets 300 can be a combination of internal and external calibration targets 300. For example, referring now to FIG. 3F, the calibration targets 300 are both internal to the vehicle 100 and external to the vehicle 100. In this approach, the calibration targets 300 are features of the vehicle 100 itself. For example, as shown, the calibration targets 300 are a rear-view mirror 360 of the vehicle 100, an A-pillar 362 of the vehicle 100, a side-view mirror 364 of the vehicle 100, etc. Other features of the vehicle 100 can be used as calibration targets 300, for example, the steering wheel, features of the seats, buttons on the instrument panel, vents, etc. In yet another example, features of the vehicle 100 can include pre-existing lights of the vehicle 100 that are selectively activatable. For example, pre-existing lights can include illuminated buttons, lights on the rear-view mirror, turn signals and/or blind spot indicators on side-view mirrors, etc.

It should be noted that while various examples of different types of calibration targets 300 are described separately with reference to their respective figure, in one or more other embodiments, different types of calibration targets 300 may be used together in the same calibration process. For example, the calibration targets 300 can include a combination of calibration targets 300 located on the windshield 320, calibration targets 300 located on the user interface 330, internal and/or external features of the vehicle itself 100, objects in the external environment of the vehicle 100, and/or other types of calibration targets 300 described herein.

In some of the above-described examples, the calibration targets 300 are stationary. In other words, the calibration targets 300 each have one location that does not substantially move or change. However, it should be understood that, in other embodiments, the calibration targets 300 are dynamic. In other words, the calibration targets 300 can move during the calibration process. For example, in embodiments that use the light bar 310 for calibration (i.e., FIG. 3A), the calibration target 300 can be indicated by activating the light bar 310 such that it appears to the occupant 370 that a light is traversing across the light bar 310. In another example, in embodiments in which a calibration target 300 is projected into the external environment (i.e., FIG. 3D), the calibration target 300 can be projected in a moving pattern. Other examples of moving calibration targets 300 can be used with respect to the other embodiments of the calibration targets 300 described herein (e.g., the embodiments shown in FIGS. 3B, 3C, 3E, and/or 3F).

Moreover, as mentioned above, the occupant may use various different body parts for gesturing. Accordingly, the calibration module 220, in one embodiment, identifies calibration targets 300 according to a detected body part used for gesturing. For example, as mentioned above, in instances in which an occupant gestures with their arm, the calibration module 220 can identify calibration targets 300 located closer together, for example, calibration targets 300 in the form of a light array as shown in FIGS. 3B and 3C. In another example, in instances in which an occupant gestures with their eyes, the calibration module 220 can identify calibration targets 300 located farther apart, for example, objects in the external environment as shown in FIG. 3E.

In any case, once the calibration module 220 has identified the calibration targets 300, in one approach, the occupant gestures at the calibration targets 300 to calibrate the gesture-based system 170. Accordingly, the calibration module 220 includes instructions that cause the processor 110 to instruct the occupant to gesture at the calibration targets 300. The instructions can be in one or more forms. For example, in one approach, the instructions are auditory instructions provided to the occupant through the output system 135, which may include a sound system located in the passenger compartment of the vehicle 100. In another approach, the instructions are provided visually, for example, by illuminating and/or projecting the calibration targets 300. In yet another approach, the instructions may be written. Examples of written instructions include written instructions provided on the output system 135 (e.g., the user interface 330 or a heads-up display), instructions written in a user manual of the vehicle 100, etc. Where multiple calibration targets 300 are identified at one time, the calibration module 220 can instruct the occupant to gesture at the calibration targets 300 sequentially in a manner that indicates to the occupant when to gesture at each of the calibration targets 300.

In the example shown in FIG. 3E, upon identification of objects and/or areas in the external environment that serve as calibration targets 300, the calibration module 220, in one approach, instructs the occupant to gesture at the objects and/or areas by specifically identifying each calibration target 300. For example, the calibration module 220 can instruct the occupant by issuing verbal instructions saying, “Point to the street sign.” In some instances, the instructions can include specific details about the calibration targets 300 so that the occupant can properly identify them. In another approach, the calibration module 220 identifies the objects and/or areas by illuminating a portion of the windshield or projecting an image on the windshield that aligns with the object and/or area in a line-of-sight of the occupant. In yet another approach, the calibration module 220 identifies the objects and/or areas by showing an image of the object and/or area on the user interface 330.

Upon receipt of the instructions, the occupant may gesture at the calibration targets 300. The gestures can take various forms. In one approach, as shown in FIGS. 3A-3F, the gestures are pointing gestures in which an occupant 370 points at the calibration targets 300 with a body part. As shown in the figures, the body part is a finger, and the occupant 370 lifts their arm and wrist, makes a pointing shape with their index finger, and points at the calibration target 300. In other examples, the occupant 370 can make pointing gestures with another body part, for example, another finger, multiple fingers, their hand, their shoulder, their elbow, their head (e.g., a head tilt or a head nod), or even one or more eyes (e.g., the occupant 370 points to the calibration targets 300 by looking at the calibration targets 300). In embodiments in which the calibration targets 300 are dynamic, the gestures can be sweeping gestures. For example, the occupant 370 can gesture toward the calibration targets 300 by following the movement of the calibration targets 300. Again, the occupant 370 can make sweeping gestures with a suitable body part, for example, by moving their finger(s), hand, arm, etc., or by following the calibration targets 300 with their eyes.

Since multiple types of gestures may be used during the calibration process, the instructions may instruct the occupant accordingly. In one example, in embodiments in which multiple calibration targets are used, the instructions direct the occupant 370 to gesture sequentially at separate, stationary calibration targets 300. In another example, the instructions direct the occupant 370 to make a sweeping gesture across multiple separate stationary calibration targets 300. In yet another example, the instructions direct the occupant 370 to make a sweeping gesture to follow a single dynamic calibration target 300. In still another example, the instructions direct the occupant 370 to make multiple sweeping gestures sequentially to follow separate dynamic calibration targets 300.

As the occupant 370 gestures at the calibration targets 300 or after the occupant 370 has gestured at the calibration targets 300, the calibration module 220 detects the gestures. Accordingly, the calibration module 220 includes instructions that cause the processor 110 to detect the gestures. In one embodiment, the calibration module 220 detects the gestures using the sensor data 250. More specifically, in one approach, the calibration module 220 uses the sensor data 250 to detect positional information of the gestures. In one approach, the calibration module 220 detects positional information of the gestures by correlating the gestures with the calibration targets 300 to detect offset angles of the gestures in relation to the calibration targets 300. Accordingly, in response to detecting the gestures, the calibration module 220 includes instructions that cause the processor 110 to correlate the gesture with the locations of the calibration targets 300. An example offset angle $\alpha$ is shown in FIG. 3B. In FIG. 3B, the offset angle $\alpha$ is measured with respect to an origin of the calibration targets 300, for example, the center calibration target 300 in the array. However, in other examples, the offset angle $\alpha$ can be measured with respect to another origin, another calibration target 300, or another fixed point in space.

In order to detect the offset angles, in one approach, the calibration module 220 identifies the locations of the calibration targets 300. In some instances, the calibration module 220 inherently knows the locations of the calibration targets 300 since the calibration module 220 identifies the calibration targets 300. For example, in embodiments in which the calibration targets 300 are areas of the light bar 310, the calibration module 220 knows the locations of the selectively-activated areas of the light bar 310. In embodiments in which the calibration targets 300 are displayed on the windshield 320 or the user interface 330, the calibration module 220 knows the locations of the illuminated, displayed, or projected calibration targets 300. Moreover, in embodiments in which the calibration targets 300 are located in the external environment (e.g., objects in or areas of the external environment), the calibration module 220 may identify the locations of the calibration targets 300 in connection with an autonomous driving module 160 of the vehicle 100, which may work in the background to identify such objects and/or areas.

The calibration module 220, in one embodiment, compares the locations of the calibration targets 300 to the positional information of the gestures to identify the offset angles. In one approach, the calibration module 220 compares the locations of the calibration targets 300 to the positional information of the gestures in different regions of the internal and/or external environments of the vehicle 100. FIG. 3D depicts various regions of the environment (internal and/or external) of the vehicle 100. As shown in FIG. 3D, the regions include a left region, a center region, and a right region each corresponding to the three calibration targets 300 shown. However, in other embodiments, the regions can include another number of regions. In any case, for each region, the calibration module 220 can compare the locations of the calibration targets 300 to the positional information of the gestures to identify offset angles for each gesture in its respective region. In this way, the calibration module 220 can identify the manner in which the occupant 370 points in different regions. For example, the occupant 370 may gesture relatively accurately (e.g., with smaller offset angles) toward calibration targets 300 located in a region generally straight-ahead of the occupant 370, while gesturing less accurately (e.g., with greater offset angles) toward calibration targets 300 located in a region farther from the occupant 370.

Upon identification of the offset angles of the gestures, the calibration module 220, in one approach, determines whether there is sufficient information to derive a biometric signature of the occupant 370. In some embodiments, sufficient information may be achieved when the calibration module 220 has identified a minimum number of offset angles (e.g., 2 offset angles, 3 offset angles, etc.). In another approach, the calibration module 220 determines that there is sufficient information through a machine learning process. Upon determining that there is not sufficient information to derive a biometric signature of the occupant 370, the calibration module 220, in one approach, is configured to acquire additional information, including positional information of additional gestures and/or additional calibration targets 300. In one embodiment, the calibration module 220 generates additional information by repeating the process in which the calibration module 220 identifies calibration targets 300, instructs the occupant 370 to gesture at the calibration targets 300, detects the gestures, and correlates the gestures with the locations of the calibration targets 300. In one approach, the calibration module 220 can sequentially identify additional calibration targets 300 and detect subsequent gestures one by one until sufficient information exists to derive the biometric signature. In another approach, the calibration module 220 can identify two or more additional calibration targets 300 at once and repeat this process until sufficient information exists to derive the biometric signature. In some embodiments, repeating the calibration process results in a better derivation of the biometric signature.

When the calibration module 220 determines that there is sufficient information, in one approach, the calibration module 220 will derive the biometric signature. In one approach, deriving the biometric signature includes populating the offset angles to a matrix. Accordingly, in one example, the biometric signature is a matrix of the offset angles of the gestures according to the manner in which the occupant gestures in different regions of the environment. As mentioned above, the body part with which the occupant 370 performs gestures and/or the seat from which the occupant 370 performs gestures may affect the calibration process, and ultimately, lead to various biometric signatures for different body parts and/or seats. Accordingly, deriving the biometric signature can also include populating different matrices according to different body parts and/or different seats.

Moreover, deriving the biometric signature, in one or more embodiments, is accomplished through a machine learning model. For example, in instances in which calibration targets 300 are displayed only in one region (e.g., the center region of FIG. 3D), the calibration module 220 may determine offset angles of gestures towards other regions (e.g., the left region or the right region of FIG. 3D) based on the offset angles of the detected gestures toward the calibration targets 300 that are displayed, even in the absence of calibration targets 300 in the other areas. In this way, the calibration module 220 can learn over time how the occupant 370 gestures in different regions of the environment.

Once the calibration module 220 derives the biometric signature, in one or more embodiments, the calibration module 220 validates the biometric signature. Validating the biometric signature is advantageous, as the validation ensures a good-quality calibration. As used herein, in one example, a "good-quality calibration" is achieved when the biometric signature is mathematically validated, for example, through a machine learning process. In another example, a "good-quality calibration" is achieved when the occupant 370 verifies the calibration. In one approach, this occurs by displaying the occupant's calibration, for example, on a heads-up display or the user interface 330, and receiving an input from the occupant 370 confirming the calibration.

In the event the biometric signature is not validated, for example, if the biometric signature is not mathematically validated or if the occupant 370 rejects the calibration, the calibration module 220 can re-initiate the calibration process. More specifically, in one approach, the calibration module 220 identifies one or more additional calibration targets 300, instructs the occupant 370 to gesture at the additional calibration target(s) 300, detects additional gesture(s), correlates the additional gesture(s) with the location(s) of the additional calibration target(s), determines whether there is sufficient information to derive a biometric signature, and, if so, derives the biometric signature.

Once the calibration module 220 has derived and/or validated the biometric signature, the biometric signature is ready to use for various purposes, for example, by the execution module 230. In one embodiment, the calibration module 220 includes instructions that cause the processor 110 to provide the biometric signature. In one example, the calibration module 220 provides the biometric signature to the execution module 230, or, in another example, the calibration module 220 provides (e.g., stores) the biometric signature to the processor 110 for later use by the execution module 230.

In one approach, the execution module 230 uses the biometric signature to better identify gestures performed by the occupant 370 when using various features of the gesture-based system 170. When using the gesture-based system 170, as described briefly above, the occupant 370 can gesture at objects and/or areas within the internal or external environments of the vehicle 100 in order to receive information from the gesture-based system about those objects and/or areas or to execute an action based on those objects and/or areas. The objects and/or areas, as described herein, are gesture targets, and include, for example, buildings (e.g., stores, restaurants, schools, businesses, etc.), features of nature (e.g., mountains, trees, rivers, lakes, etc.), nearby vehicles, pedestrians, cyclists, etc., components of the vehicle itself (e.g., vents, buttons, a heads-up display, the user interface 330, etc.). In some instances, the occupant 370 may accompany the gesture toward the gesture target with a verbal input, for example, a question or a command. For example, the occupant 370 may gesture toward a restaurant and tell the gesture-based system, "Please make a reservation at that restaurant." In another example, the occupant 370 may gesture toward a mountain range and ask the gesture-based system, "What is that mountain range?" However, the occupant 370 may also use the gesture-based system 170 without a verbal input. For example, the occupant 370 may gesture toward the heads-up display or the user interface 330 upon receipt of a text message or a phone call to activate the gesture-based system 170 to read the text message or answer the phone call.

As mentioned above, the execution module 230 uses the biometric signature to better identify gestures performed by the occupant 370 toward gesture targets. In other words, the execution module 230, in one embodiment, includes instructions that cause the processor 110 to provide the biometric signature by detecting a gesture, identifying a gesture target based on the gesture and the biometric signature, and executing an action based on the gesture target. Each of these actions will be described in further detail below with respect to FIG. 4.

Figure 4:
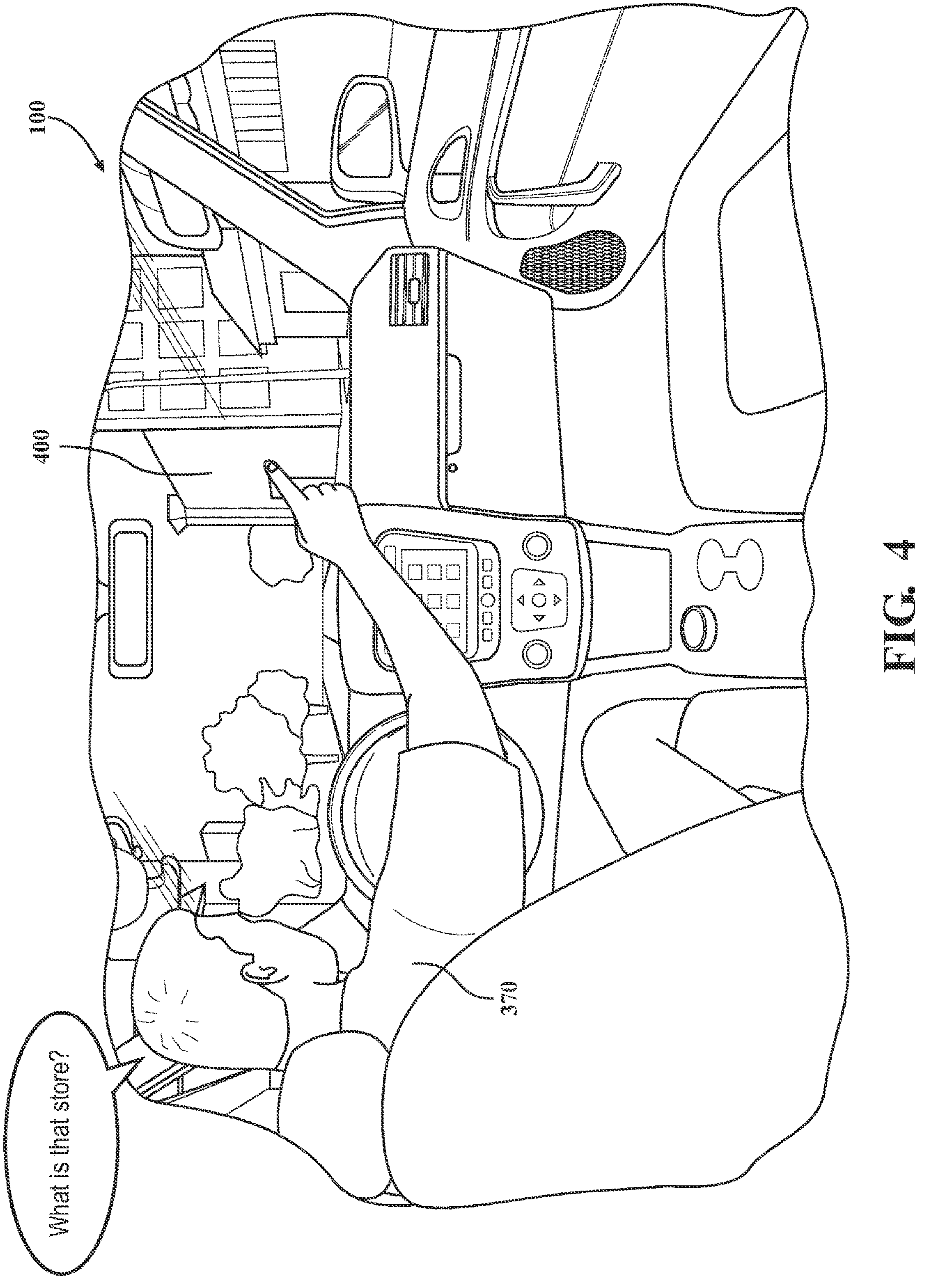
FIG. 4 illustrates one embodiment of detecting a gesture and a corresponding gesture target using the gesture-based system.

As mentioned above, the occupant 370 can perform a gesture when using the gesture-based system 170 to receive information and/or execute actions corresponding to objects and/or areas in the internal and/or external environments of the vehicle 100 toward which the occupant 370 gestures. As shown in FIG. 4, the occupant 370 gestures toward a store 400 in the external environment of the vehicle 100 and asks the gesture-based system 170, "What is that store?" Accordingly, in one approach, the execution module 230 detects the gesture and returns information regarding the store 400 to the occupant 370.

To detect the gesture, the execution module 230 may use the same or similar processes as the execution module 230 when detecting gestures during calibration. For example, the execution module 230 may detect gestures using the sensor data 250. However, the gestures aimed at gesture targets may be detected when the occupant 370 uses the gesture-based system 170 outside of the calibration process. In addition to detecting the gesture, the execution module 230, in one approach, also detects positional information of the gesture. The execution module 230 can detect the positional information of the gesture using the same or similar process as the calibration module 220 when detecting positional information of gestures during calibration. Accordingly, in one approach, the execution module 230 detects an offset angle of the gesture.

To identify the gesture target, which in the example shown, is the store 400, the execution module 230, in one approach, translates the positional information of the gesture according to the matrix. In other words, in one embodiment, the execution module 230 detects the location of the gesture and translates it according to the offset angle corresponding to the region in which the gesture is located. For example, as shown in FIG. 4, the gesture is in a right region of the environment, so accordingly, the execution module 230 translates the location of the gesture according to an offset angle determined for the right region of the environment. In this way, the execution module 230 has the ability to identify gesture targets based on gestures through use of the biometric signature.

Once the execution module 230 identifies the gesture target, in one embodiment, the execution module 230 also executes an action based on the gesture target. As mentioned above, the execution module 230 can return information regarding the gesture target to the occupant 370 and/or execute a function according to the gesture target. In the example shown in FIG. 4, the gesture target is a store 400. Accordingly, the execution module 230 can return information on the store 400 to the occupant 370. In some instances, the execution module executes the action based on a verbal input by the occupant 370 as well. For example, as shown in FIG. 4, the verbal input is a question to obtain more information about the store 400. Accordingly, the execution module 230 is configured to not only identify the gesture target in correspondence with executing an action but can also execute the action based on the verbal input.

As mentioned above, the biometric signature can be used for various purposes in addition to identifying gesture targets and executing actions based on the gesture targets. In addition to or alternatively from identifying gesture targets based on the biometric signature, the execution module 230 can use the biometric signature to configure various aspects of the vehicle 100 according to the biometric signature of a specific occupant 370. This may be accomplished by storing the biometric signature to an occupant profile associated with the occupant 370 and configuring various aspects of the vehicle 100 according to the occupant profile and the biometric signature. In other words, the execution module 230, in one embodiment, includes instructions that cause the processor 110 to provide the biometric signature by storing the biometric signature to an occupant profile and configuring vehicle parameters based on the occupant profile and the biometric signature.

In one approach, the occupant profile is stored locally to the vehicle 100, for example, in one or more data store(s) 115 of the vehicle 100. In another approach, the occupant profile is stored remotely from the vehicle 100, for example, in a cloud-based system accessible by the processor 110, or another remote memory accessible through V2X communications. In yet another approach, the occupant profile is stored on a portable storage device such as a key-fob, a flash drive, etc. In some instances, the occupant profile is transferable between vehicles, for example, through V2V, V2I, and/or V2X communications, using the portable storage device in connection with different vehicles, etc.

As mentioned above, the execution module 230, in one approach, stores the biometric signature to the occupant profile and configures vehicle parameters based on the occupant profile and the biometric signature. In one approach, the vehicle parameters include system preferences, for example, HVAC settings, positions of the seats, the steering wheel, the side view mirrors, and/or the rear view mirror, display settings related to the heads-up display and/or the user interface 330 (e.g., volume, brightness, etc.), driving modes, EV charging settings, and other system preferences for which the occupant 370 may be able to designate a preference. In some instances, the system preferences include a preference for a type of calibration target 300 used by the calibration module 220. For example, the occupant 370 can set a preference for using calibration targets 300 on the light bar 310. Additionally or alternatively, the vehicle parameters include access rights to the vehicle 100. For example, upon identification of the occupant 370 (for example, through the sensor system 120, through use of a key-fob or flash drive, etc.), the calibration module 220 configures access rights such as access rights to vehicular settings, speed limit settings, pairing settings between the vehicle and mobile devices, etc.

In some instances, it may be advantageous to allow an occupant to transfer their biometric signature to another vehicle so that the second vehicle, if equipped with a similar gesture-based system, can be automatically calibrated to the occupant's biometric signature. Accordingly, the calibration module includes instructions that cause the processor to store an occupant's biometric signature on a storage medium. In one approach, the storage medium can be the memory and/or the data store of the first vehicle. From there, the instructions can further cause the processor to download or transfer the biometric signature to another storage system, a portable memory, and/or a second vehicle. For example, the biometric signature can be transferred to a wireless network or another storage system using a vehicle-to-infrastructure (V2I) network. In another example, the biometric signature can be transferred to a second vehicle using vehicle-to-vehicle (V2V) communication. In yet another example, the biometric signature can be downloaded to a portable memory so that the occupant can upload the biometric signature to another system, such as a second vehicle. The portable memory can be a key-fob, a flash drive, etc.

Figure 5:
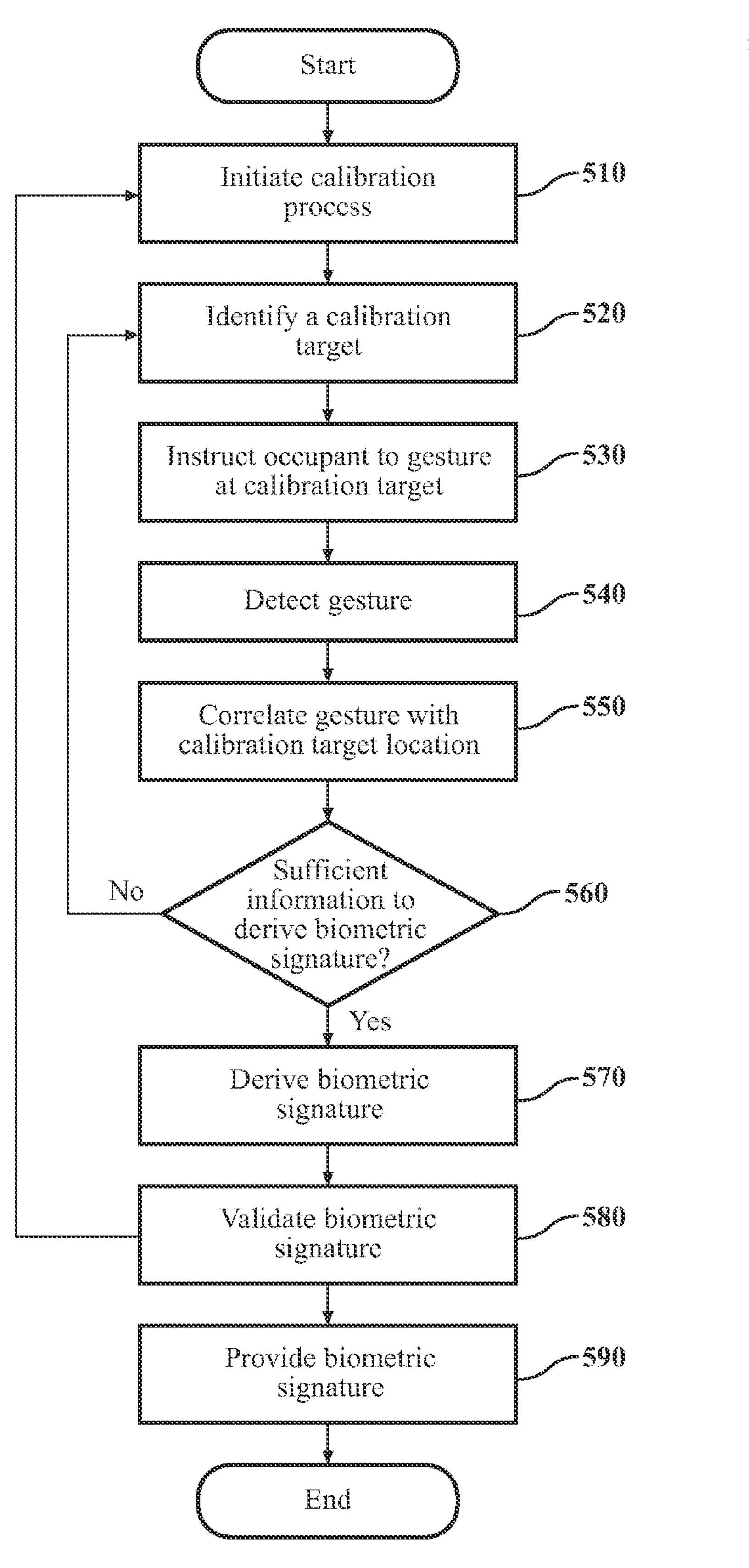
FIG. 5 illustrates one embodiment of a method of calibrating the gesture-based system to derive a biometric signature of an occupant of a vehicle.

Now that various aspects of the gesture-based system 170 have been discussed, methods associated with operating the gesture-based system 170 will now be described. FIG. 5 illustrates a flowchart of a method 500 that is associated with executing a calibration process of the gesture-based system 170. Method 500 will be discussed from the perspective of the gesture-based system 170 of FIGS. 1 and 2. While the method 500 is discussed in combination with the gesture-based system 170, it should be appreciated that the method 500 is not limited to being implemented within the gesture-based system 170 but is instead one example of a system that may implement the method 500.

At 510, in one approach the calibration module 220 initiates a calibration process upon detection of an occupant entering the vehicle 100, upon detection of a starting signal of the vehicle 100, upon determination that calibration is needed, and/or another condition associated with gesturing. In another example, the calibration module 220 initiates the calibration process periodically to maintain accuracy of the calibration through a trip in the vehicle 100.

After initiation of the calibration process, at 520, the calibration module 220 identifies calibration targets 300. As mentioned above, the calibration targets 300 are one or more selectively activatable areas of a light bar 310 of the vehicle 100, areas of a windshield 320 of the vehicle 100, areas of a user interface 330 of the vehicle 100, objects or images displayed on objects in the external environment of the vehicle 100, and/or features of the vehicle 100 itself. In one embodiment, the calibration module 220 identifies the calibration targets 300 by illuminating the calibration targets 300, projecting images or displaying icons that serve as the calibration targets 300, or identifying the calibration targets 300 through instructions.

Upon identification of the calibration targets 300, in one approach, at 530, the calibration module 220 instructs the occupant to gesture at the calibration targets 300 by providing audial instructions through the output system 135 of the vehicle 100, providing visual instructions by illuminating and/or projecting the calibration targets 300, and/or providing written instructions, for example, on the output system 135 or in a user manual of the vehicle 100. Where the calibration module 220 identifies multiple calibration targets 300 the calibration module 220, in one approach, instructs the occupant to gesture at the calibration targets 300 sequentially in a manner that indicates to the occupant when to gesture at each of the calibration targets 300.

Upon receipt of the instructions, the occupant may gesture at the calibration targets 300. Accordingly, in one approach, at 540, the calibration module 220 detects the gestures, for example, using the sensor data 250. At 550, the calibration module 220, in one approach, correlates the gestures with the locations of the calibration targets 300 by detecting positional information of the gestures, which includes offset angles of the gestures in relation to the calibration targets 300.

At 560, in one approach the calibration module 220 determines whether there is sufficient information to derive a biometric signature of the occupant 370, for example, by identifying a minimum number of offset angles or determining that there is sufficient information, which involves using a machine learning process. If there is not sufficient information to derive a biometric signature, the method 500 may return to 520. However, once sufficient information has been obtained, at 570, in one approach, the calibration module 220 derives a biometric signature of the occupant 370, for example, by populating the offset angles into a matrix. In one example, the calibration module 220 derives the biometric signature by deriving a matrix of the offset angles of the gestures according to the manner in which the occupant gestures in different regions of the environment and, in some examples, according to different body parts and/or different seats.

Figures 6, 7:
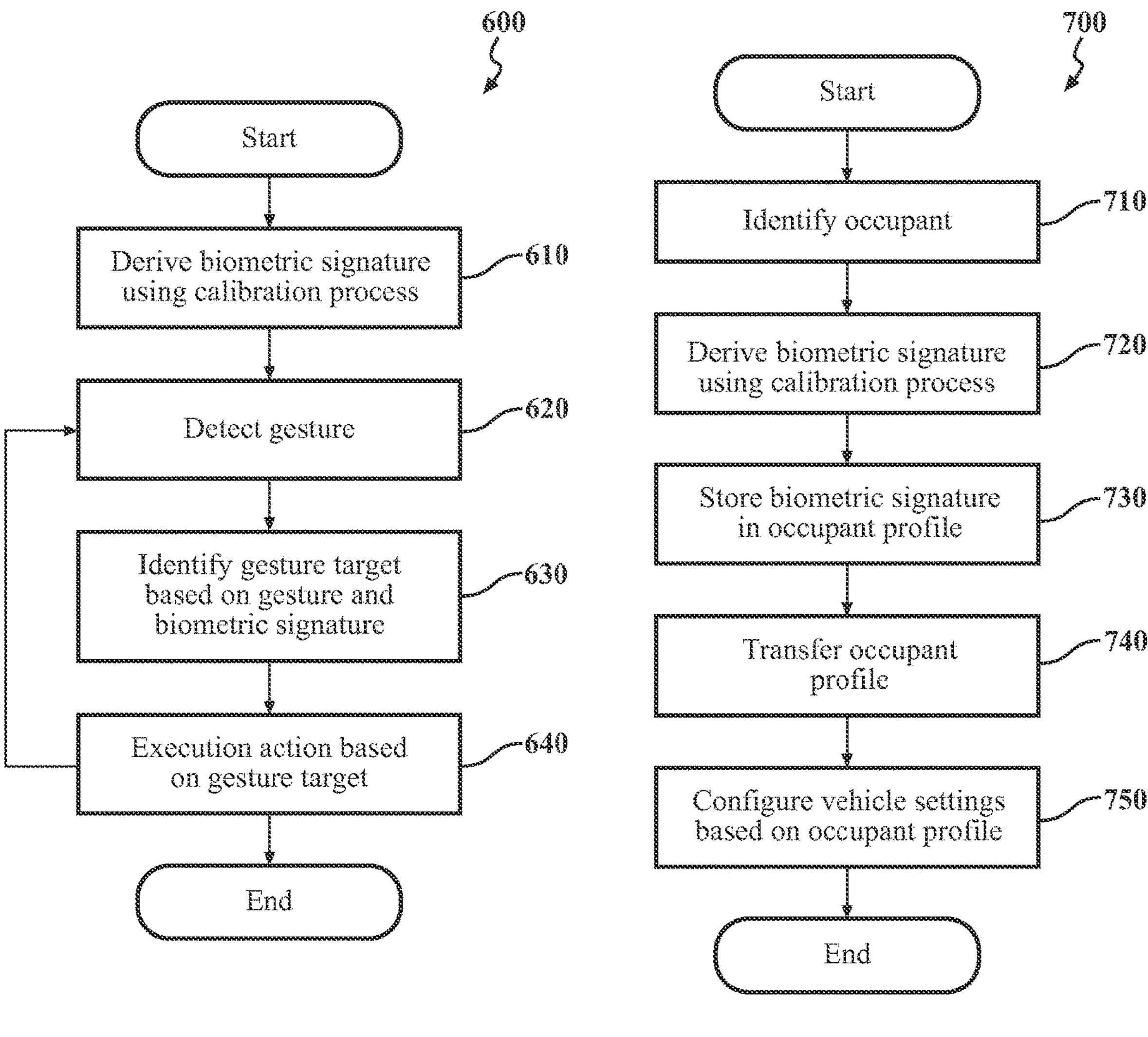
FIG. 6 illustrates one embodiment of a method of identifying a gesture and a corresponding gesture target using a biometric signature.
FIG. 7 illustrates one embodiment of a method of storing a biometric signature to an occupant profile and configuring vehicle settings based on the biometric signature and the occupant profile.

At 580, in one approach, the calibration module 220 validates the biometric signature, for example, mathematically through a machine learning process, and/or by confirming the calibration with the occupant 370. In the event the biometric signature is not validated, the method 500 can return to 510 and re-initiate the calibration process. In one approach, after validating the biometric signature, the calibration module 220 provides the biometric signature at 590. The calibration module 220 provides the biometric signature for various purposes, for example, for better identification of gestures performed by the occupant when using the gesture-based system 170 outside of the calibration process and/or for configuring various vehicle settings, for example, system preferences and/or access rights. FIGS. 6 and 7, discussed in further detail below, illustrate flowcharts of methods that involve providing the biometric signature.

Referring now to FIG. 6, FIG. 6 illustrates a flowchart of a method 600 that is associated with operating the gesture-based system 170 after execution of the calibration process. Method 600 will be discussed from the perspective of the gesture-based system 170 of FIGS. 1 and 2. While the method 600 is discussed in combination with the gesture-based system 170, it should be appreciated that the method 600 is not limited to being implemented within the gesture-based system 170 but is instead one example of a system that may implement the method 600.

At 610, the execution module 230, in one approach, derives a biometric signature using a calibration process. In one embodiment, the calibration process is the method 500 described above in connection with FIG. 5. Upon derivation of the biometric signature, in one embodiment, the execution module 230 detects a gesture at 620 performed by the occupant 370 outside of the calibration process. For example, the execution module 230 detects a gesture performed by the occupant 370 for the purpose of obtaining information about or executing an action regarding an object and/or area in the internal or external environment of the vehicle 100. In some instances, the execution module 230 also detects a verbal input at 620.

After detecting the gesture and/or the verbal input, the execution module 230, at 630, identifies a gesture target based on the gesture and the biometric signature, for example, by detecting the location of the gesture and translating the location of the gesture according to the matrix in the region in which the gesture is located.

At 640, the execution module 230, in one approach, executes an action based on the gesture target, for example, by returning information about the gesture target to the occupant 370 or by executing a vehicle function based on the gesture. The method 600 can return to 620 to continue detecting gestures, identifying gesture targets based on the gestures and the biometric signature of the occupant 370, and executing actions based on the gestures.

In addition to or alternatively from executing actions based on gesture targets, the biometric signature may be used to configure vehicle settings. Referring now to FIG. 7, FIG. 7 illustrates a flowchart of a method 700 that is associated with configuring vehicle settings after execution of the calibration process. Method 700 will be discussed from the perspective of the gesture-based system 170 of FIGS. 1 and 2. While the method 700 is discussed in combination with the gesture-based system 170, it should be appreciated that the method 700 is not limited to being implemented within the gesture-based system 170 but is instead one example of a system that may implement the method 700.

At 710, the execution module 230, in one embodiment, identifies the occupant, for example, using an occupant detection system of the vehicle 100, as described below in further detail in connection with FIG. 1. For example, the execution module 230 identifies the occupant using biometric data (e.g., a fingerprint), a key-fob, a passcode, etc. The execution module 230 also, in some instances, identifies an occupant profile that is associated with the occupant and includes various information such as vehicle preferences and access rights.

Upon identification of the occupant, in one approach, at 720, the execution module 230 executes a calibration process to derive a biometric signature. In one embodiment, the calibration process is the method 500 described above in connection with FIG. 5. At 730, the execution module 230 stores the biometric signature in the occupant profile, for example, by storing the biometric signature locally to a locally-saved occupant profile, storing the biometric signature remotely to an occupant profile saved to a portable memory (e.g., a key-fob, a flash drive, etc.), or storing the biometric signature to the occupant profile in another manner.

At 740, in one embodiment, the execution module 230 transfers the occupant profile, for example, to a vehicle currently used by the occupant (e.g., the vehicle in which the calibration process was executed) or another vehicle. The occupant profile can be transferred from the memory in which the occupant profile was stored (e.g., using a key-fob). At 750, the execution module 230, in one embodiment, configures vehicle settings based on the occupant profile, for example, system preferences, preferences for a type of calibration target 300 used during the calibration process, and/or access rights to the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

In addition to the vehicle sensors 121 and the environment sensors 122, the sensor system 120 can also include one or more occupant detection sensors. The occupant detection sensors can include one or more camera(s), one or more radar sensor(s), and/or one or more other types of sensors located in the passenger compartment and configured to detect one or more occupants in the vehicle 100. The occupant detection sensors can detect the size, shape, movement, facial features, etc. of the occupant(s). In some instances, the occupant detections sensors include seat sensors, seat belt sensors, etc.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the gesture-based system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the gesture-based system 170, and/or the automated driving module(s) 160 may control some or all of these vehicle systems 140 and, thus, may be partially or fully autonomous.

The processor(s) 110, the gesture-based system 170, and/or the automated driving module(s) 160 can be operatively connected to communicate with the various vehicle systems 140 and/or individual components thereof. For example, returning to FIG. 1, the processor(s) 110, the gesture-based system 170, and/or the automated driving module(s) 160 can be in communication to send and/or receive information from the various vehicle systems 140 to control the movement, speed, maneuvering, heading, direction, etc. of the vehicle 100. The processor(s) 110, the gesture-based system 170, and/or the automated driving module(s) 160 may control some or all of these vehicle systems 140.

The processor(s) 110, the gesture-based system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the gesture-based system 170, and/or the automated driving module(s) 160 can control the direction and/or speed of the vehicle 100. The processor(s) 110, the gesture-based system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores 115 may contain such instructions.

In one or more arrangements, one or more of the modules described herein can include artificial or computational intelligence elements, e.g., neural networks, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate the position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the gesture-based system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

The embodiments described herein have the advantage of providing systems and methods for ameliorating existing issues with gesture-based systems for vehicles, including issues related to detection of gestures and objects and/or areas toward which an occupant gestures as a result of the unique particularities in the manner in which the occupant gestures. The embodiments described herein also have the advantage of considering other aspects that may affect detection in gesture-based systems, for example, the use of various body parts by occupants to perform gestures and/or various locations within vehicles from which occupants perform gestures.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor;

a memory communicably coupled to the processor and storing:

a module including instructions that when executed by the processor cause the processor to:

in response to initiating a calibration process, identify calibration targets;

detect positional information of gestures performed by an occupant of a vehicle in relation to the calibration targets by detecting angles of the gestures that are offset from locations of the calibration targets;

derive, based on the positional information of the gestures and locations of the calibration targets, a biometric signature of the occupant by generating a matrix of the angles of the gestures according to a manner in which the occupant gestures in different regions of an environment of the vehicle, wherein the biometric signature includes a manner in which the occupant points that is unique to the occupant; and provide the biometric signature.

2. The system of claim 1, wherein the instructions cause the processor to identify the calibration targets by instructing the occupant to gesture at the calibration targets.

3. The system of claim 1, wherein the instructions cause the processor to initiate the calibration process by identifying a body part of the occupant used to perform gesturing, and wherein the instructions cause the processor to identify the calibration targets by identifying calibration targets based on the body part of the occupant.

4. The system of claim 1, wherein the instructions cause the processor to detect the positional information by identifying a seat of the vehicle from which the occupant performs gesturing, and wherein the instructions cause the processor to identify the calibration targets by identifying calibration targets based on the seat.

5. The system of claim 1, wherein the instructions cause the processor to provide the biometric signature by detecting a gesture, identifying a gesture target based on the gesture and the biometric signature, and executing an action based on the gesture target.

6. The system of claim 5, wherein the instructions cause the processor to derive the biometric signature by generating a matrix of the angles, and wherein the instructions cause the processor to identify the gesture target by identifying a gesture location and translating the gesture location according to the matrix.

7. The system of claim 1, wherein the instructions cause the processor to provide the biometric signature by storing the biometric signature to an occupant profile associated with the occupant that is transferable between vehicles and configuring vehicle parameters based on the occupant profile and the biometric signature.

8. A non-transitory computer-readable medium for a gesture-based system including instructions that when executed by a processor cause the processor to:

in response to initiating a calibration process, identify calibration targets;

detect positional information of gestures performed by an occupant of a vehicle in relation to the calibration targets by detecting angles of the gestures that are offset from locations of the calibration targets;

derive, based on the positional information of the gestures and locations of the calibration targets, a biometric signature of the occupant by generating a matrix of the angles of the gestures according to a manner in which the occupant gestures in different regions of an environment of the vehicle, wherein the biometric signature includes a manner in which the occupant points that is unique to the occupant; and provide the biometric signature.

9. The non-transitory computer-readable medium of claim 8, wherein the instructions cause the processor to provide the biometric signature by detecting a gesture, identifying a gesture target based on the gesture and the biometric signature, and executing an action based on the gesture target.

10. The non-transitory computer-readable medium of claim 9, wherein the instructions cause the processor to derive the biometric signature by generating a matrix of the angles, and wherein the instructions cause the processor to identify the gesture target by identifying a gesture location and translating the gesture location according to the matrix.

11. A method, comprising:

in response to initiating a calibration process, identifying calibration targets;

detecting positional information of gestures performed by an occupant of a vehicle in relation to the calibration targets by detecting angles of the gestures that are offset from locations of the calibration targets;

deriving, based on the positional information of the gestures and locations of the calibration targets, a biometric signature of the occupant by generating a matrix of the angles of the gestures according to a manner in which the occupant gestures in different regions of an environment of the vehicle, wherein the biometric signature includes a manner in which the occupant points that is unique to the occupant; and providing the biometric signature.

12. The method of claim 11, wherein identifying the calibration targets includes instructing the occupant to gesture at the calibration targets.

13. The method of claim 11, wherein initiating the calibration process includes identifying a body part of the occupant used to perform gesturing, and wherein identifying the calibration targets includes identifying calibration targets based on the body part of the occupant.

14. The method of claim 11, wherein detecting the positional information includes identifying a seat of the vehicle from which the occupant performs gesturing, and wherein identifying the calibration targets includes identifying calibration targets based on the seat.

15. The method of claim 11, wherein providing the biometric signature includes:

detecting a gesture;

identifying a gesture target based on the gesture and the biometric signature; and executing an action based on the gesture target.

16. The method of claim 15, wherein deriving the biometric signature includes generating a matrix of the angles, and wherein identifying the gesture target includes identifying a gesture location and translating the gesture location according to the matrix.

17. The method of claim 11, wherein providing the biometric signature includes:

storing the biometric signature to an occupant profile associated with the occupant that is transferable between vehicles; and configuring vehicle parameters based on the occupant profile and the biometric signature.

* * * * *